United States Patent [19]

Challenger et al.

[11] Patent Number: 4,528,057

[45] Date of Patent: Jul. 9, 1985

[54] ADHESIVE SPOT CURING PRESS AND METHOD FOR METALLIC PARTS

[75] Inventors: Richard Challenger, Cortland; William E. Mullane, Warren, both of Ohio

[73] Assignee: The Taylor-Winfield Corporation, Warren, Ohio

[21] Appl. No.: 530,393

[22] Filed: Sep. 8, 1983

[51] Int. Cl.³ .............................................. B32B 31/28
[52] U.S. Cl. ............................... 156/273.7; 156/275.3; 156/275.7; 156/291; 156/379.6; 156/379.7; 156/498; 156/583.6
[58] Field of Search ............... 156/274.8, 275.3, 380.6, 156/498, 291, 583.6, 273.7, 275.7, 379.6, 379.7

[56] References Cited

U.S. PATENT DOCUMENTS

| 2,684,319 | 7/1954 | Arnold | 156/380.6 X |
| 3,162,564 | 12/1964 | Buchner | 156/498 |
| 4,013,860 | 3/1977 | Hosterman et al. | 156/380.6 X |
| 4,293,363 | 10/1981 | Warabayashi et al. | 156/274.8 X |

*Primary Examiner*—Robert A. Dawson
*Attorney, Agent, or Firm*—William J. Ruano

[57] ABSTRACT

An adhesive bonding press having a "C" frame which mounts upper and lower platens, one of which supports an induction coil mounted in a non-metallic tube. Adhesive is applied to coat the top surface of a lower metallic plate supported on the lower platen, after which a second metallic plate is laid thereon. Thereafter, the plates are clamped together by an air cylinder through upper and lower platens and tooling holders of the press, one of which includes an induction coil. High frequency current is then applied to the induction coil which rapidly heats the adhesive for 2 to 3 seconds. An air blast is then induced in the upper and lower tooling to rapidly cool the parts to room temperature. Spot curing takes place in the area axially of the induction coil which very firmly bonds the two plates together so that further operations in a production or automation line will take place immediately. The spot curing may be done in a number of spots on larger pieces or, for small pieces, may cover the entire area of the adhesive when metallic pieces are to be adhered together.

6 Claims, 4 Drawing Figures

ADHESIVE SPOT CURING PRESS AND METHOD FOR METALLIC PARTS

This invention relates to an adhesive bonding press and method of spot curing two metallic pieces together extremely rapidly.

In modern production or automation lines, an objective is to assemble parts together, such as those of a refrigerator, in as short a time as possible. This has been impeded by the delay caused by the curing time necessary for curing the adhesive to effectively bond two parts together. This has taken minutes of time, delaying other operations,—such as the adhering of other parts together.

An object of the present invention is to overcome the above-named disadvantage and delay in production by greatly speeding the curing time for bonding parts together in an assembly or automation line so as to greatly speed up production and lower costs.

A more specific object of the invention is to embody an induction coil and air blast in one or both of the platens of the press so as to rapidly apply heating and cooling for curing the adhesive layer between two parts clamped together by the platens.

Other objects and advantages of the invention will become more apparent by a study of the following description taken with the accompanying drawing wherein.

Figure 2:
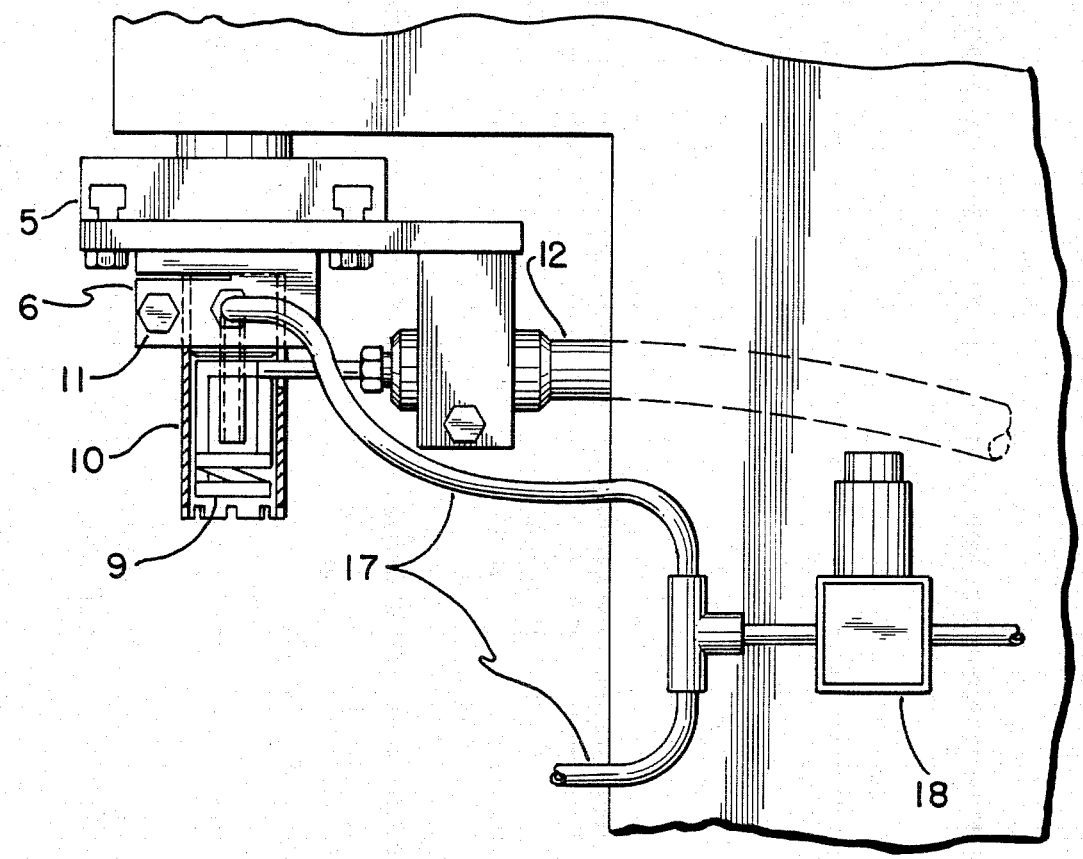
FIG. 2 is an enlarged fragmentary view thereof, partly in vertical cross-section, showing the upper tooling holder.
Figure 3:
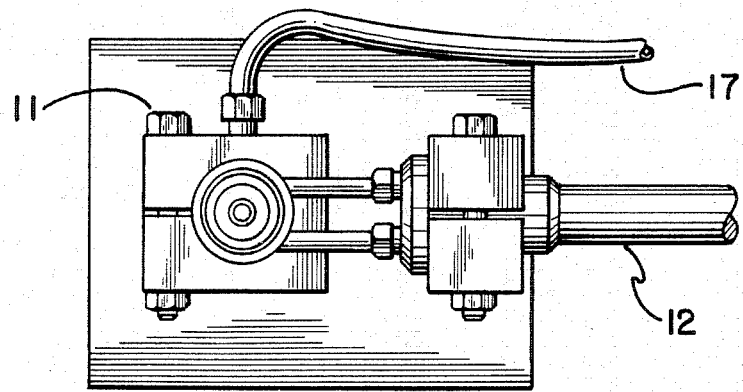

FIG. 3, bottom view of FIG. 2; and

Figure 4:
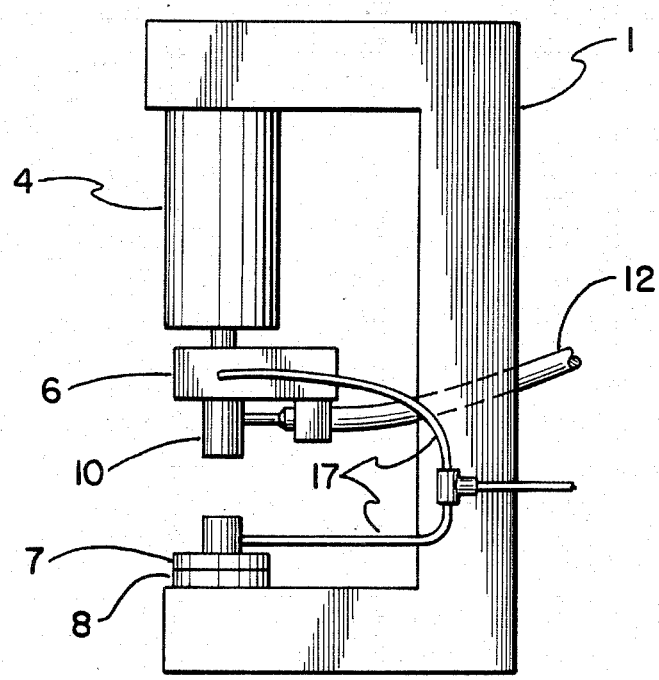

FIG. 4 is an elevational view of a modification of the press.

Figure 1:
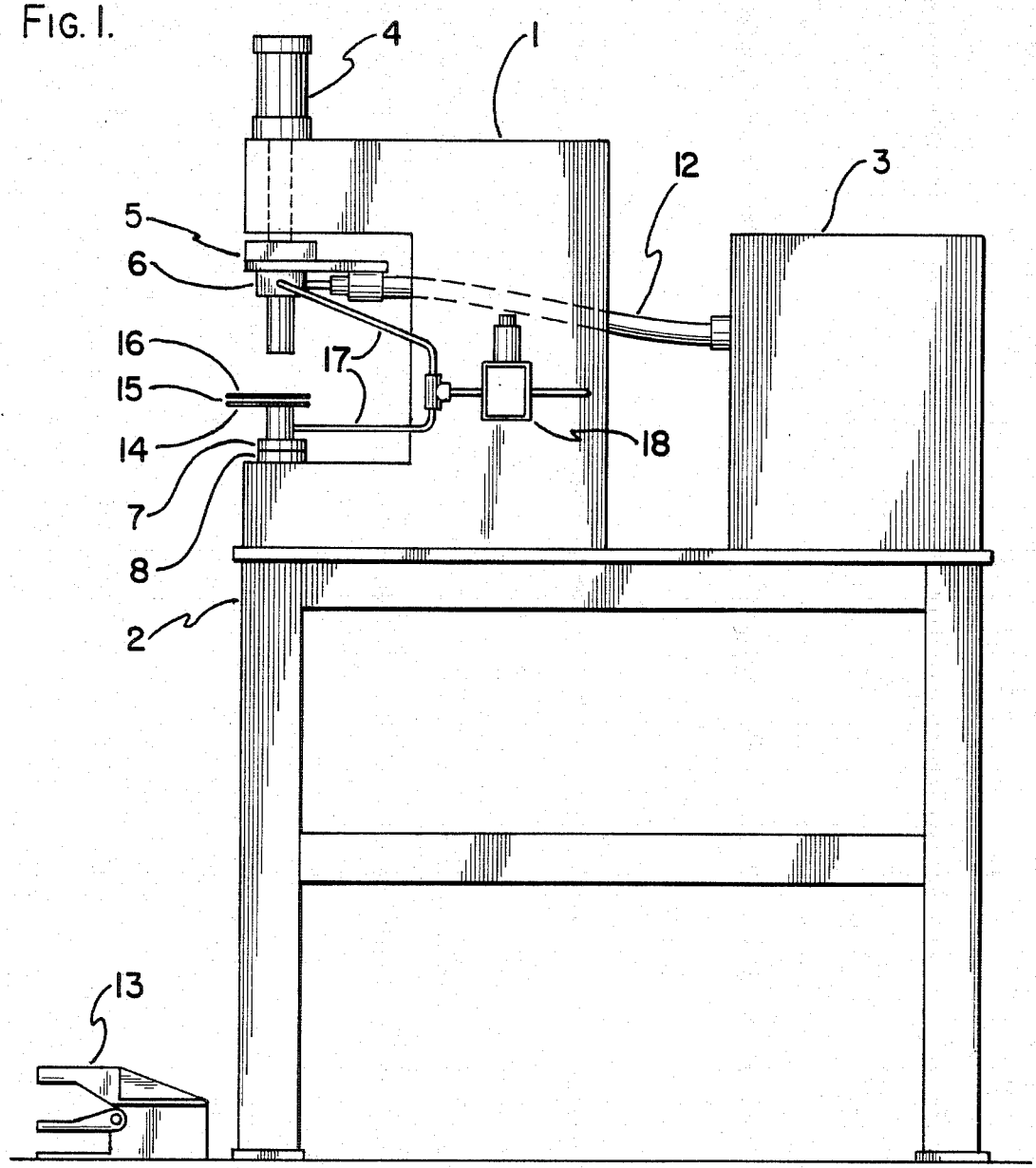
FIG. 1 is an elevational view of an adhesive bonding press embodying the present invention.

Referring more particularly to FIG. 1 of the drawing, numeral 1 denotes a "C" frame of a press mounted on a table 2. Also mounted on table 2, is an induction current generator 3. A fluid operated cylinder, such as an air cylinder 4, is mounted on the "C" frame 1 and is attached to an upper platen 5. An upper tooling holder 6 is bolted to upper platen 5. Likewise, the lower tooling holder 7 is bolted to a lower platen 8.

As will appear more clearly in FIG. 2, an induction coil 9, in the form of a helix, is energized by the induction generator 3 through wires in a flexible cable 12. Coil 9 is mounted inside a non-metallic tube 10 which is clamped into the tooling holder by bolt 11. While the induction coil 9 is shown as being mounted on the upper tooling holder 6, it may be, instead, mounted on the lower tooling holder 7, depending upon the application.

In operation, a sheet metal part 14, such as a part of a refrigerator or other apparatus, is placed on the lower tooling holder 7. The operator then applies a layer of adhesive 15 on the top surface of part 14. The operator then places, on such layer, a second sheet metal part 16 to which part 14 is to be adhered. The operator then depresses a foot switch 13 of an electrical system, such as well known in the art, which causes air cylinder 4 to move its piston downwardly to lower the upper tooling holder 6 and attached induction coil 9, clamping the metal parts 14 and 16 together. The induction generator 3 is then turned on, causing high frequency current to pass through flexible cable 12 to induction coil 9, heating the sheet metal parts 14 and 16 and thereby heating the adhesive 15 at an extremely rapid rate. After heating, solenoid air valve 18 opens allowing air to pass through lines 17 and through the upper and lower tooling to rapidly cool the parts.

Tests show that heating is effected in about two seconds and cooling in 2 to 3 seconds for a cure time of 5 seconds, at temperatures of 200° to 250° F. on two pieces of 0.025 Cold Rolled Steel.

The cylinder 4 then retracts the upper platen 5 and tooling holder 6 and the operator removes the adhesive bonded assembly which has been spot cured in one location or spot that is axially of coil 9. The remaining area, which has not been spot cured, will be allowed to cure at room temperature in a few minutes. However, it will not be necessary to await those few minutes, as far as the production line is concerned, since such spot curing by induction coil 9 and air blast 18 will bond parts 14 and 16 sufficiently strongly together that they can undergo other steps or operations in the production or automation line. Tensile tests have shown that the spot curing is so effective in holding parts together as to resist 500 pounds or better per square inch without pulling apart such parts 14 and 16.

Of course, if parts 14 and 16 are large, more than one spot cure may be made to the adhesive.

The adhesive spot curing press of the present invention is particularly adapted to parts 14 and 16 which have been coated on both sides with paint,—such as by a roller process. The trend nowadays in the production line is to adhere together parts after they have been painted so as to avoid the necessity of a subsequent paint spraying process which contaminates the air.

FIG. 4 shows a modification of FIG. 1 embodying a portable "C" frame gun. Individual guns may be mounted on a special machine. As stated previously, the induction coil 9 and cable 12 may be mounted either on the upper tooling holder 6, as shown in FIG. 2, or on the lower tooling holder 7, either on the press shown in FIG. 1 or that shown in FIG. 4.

Thus it will be seen that the present invention provides a novel apparatus and method for spot curing adhesives for holding together metal parts, unpainted, or painted metal, in an assembly line in a matter of seconds, such as about 5 seconds, instead of minutes. Thus a pre-painted steel refrigerator cabinet can be speedily produced by using the present adhesive spot curing method. The spot cured areas would provide enough strength to allow transporting the cabinet through the various operations of an automation line. The remaining areas of the adhesive will cure at room temperature in about 5 to 15 minutes, depending upon the adhesive. Automation lines of this type normally have cycle times of 10 to 20 seconds. While we have illustrated and described several embodiments of my invention, it will be understood that these are by way of illustration only and that various changes and modifications may be contemplated in our invention and within the scope of the following claims.

We claim:

1. An addhesive spot curing press mounted on a table and comprising a C-shaped frame having mounted thereon an upper and lower platen on the respective extremeties of said frame, a tooling holder attached to each platen, an induction coil enclosed by a non-metallic housing attached to one of said platens, an induction current generator connected to said coil, fluid operating means mounted on one of said extremities and connected to one of said platens for clamping said platens together after there has been inserted, therebetween, metallic pieces having sandwiched therebetween an adhesive, and air cooling means connected to the tooling holder for at least one of said platens, whereby the adhesive may be cured in only one central spot which is axially of said coil by induction current, and thereby providing an air blast by said air cooling means for quickly cooling said spot.

2. A method for spot curing two metallic pieces having an adhesive layer sandwiched therebetween using an adhesive spot curing press mounted on a table and comprising a C-shaped frame having mounted thereon an upper and lower platen on the respective extremities of said frame, a tooling holder attached to each platen, an induction coil enclosed by a non-metallic housing attached to one of said platens, an induction current generator connected to said coil, fluid operating means mounted on one of said platens for clamping said platens together after there has been inserted, therebetween, metallic pieces having sandwiched therebetween an adhesive, and air cooling means connected to the tooling holder for at least one of said platens, comprising clamping together said pieces between said tooling holders with said adhesive layer between, applying induction heating current by said induction coil in only one central spot, leaving the remainder of the layer uncured and thereafter air cooling by said air cooling means and unclamping said pieces and thereafter curing said remainder of the layer.

3. The method recited in claim 2 wherein said pieces are of unpainted metal.

4. The method recited in claim 2 wherein said pieces are of pre-coated metal.

5. The method recited in claim 2 wherein said spot curing is followed by curing in ambient temperature.

6. The method recited in claim 2 wherein said spot curing is followed by heating of said pieces and adhesive layer.

* * * * *